United States Patent
Ozeki

(10) Patent No.: US 6,243,627 B1
(45) Date of Patent: Jun. 5, 2001

(54) ELECTRONIC CONTROL SYSTEM AND METHOD FOR ERASING ABNORMALITY DATA GENERATED DURING CONTROLLER RELOADING

(75) Inventor: Yoshifumi Ozeki, Anjo (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 09/238,738

(22) Filed: Jan. 28, 1999

(30) Foreign Application Priority Data

Feb. 19, 1998 (JP) .................................................. 10-037571

(51) Int. Cl.⁷ ......................................................... G06F 7/00
(52) U.S. Cl. ...................... 701/29; 123/479; 340/825.16; 701/33; 701/114
(58) Field of Search ................................... 701/29, 31, 33, 701/35, 102, 107, 114, 115; 700/2; 340/425.5, 438, 459, 500, 825.16, 635; 324/500, 503, 537; 123/479

(56) References Cited

U.S. PATENT DOCUMENTS

| | | | |
|---|---|---|---|
| 5,479,347 | * 12/1995 | Oguro et al. ............................ | 701/35 |
| 5,966,305 | * 10/1999 | Watari et al. ......................... | 701/107 |
| 5,987,365 | * 11/1999 | Okamoto ................................ | 701/29 |
| 6,067,009 | *  5/2000 | Hozuka et al. ....................... | 340/459 |
| 6,108,598 | *  8/2000 | Sumitani ................................ | 701/29 |

FOREIGN PATENT DOCUMENTS

| | | |
|---|---|---|
| 5-44570 | 2/1993 | (JP) . |
| 6-272611 | 9/1994 | (JP) . |
| 8-102752 | 4/1996 | (JP) . |

* cited by examiner

Primary Examiner—William A. Cuchlinski, Jr.
Assistant Examiner—Edward Pipala
(74) Attorney, Agent, or Firm—Nixon & Vanderhye P.C.

(57) ABSTRACT

A control system for an automotive vehicle comprising a plurality of electronic control units (ECUs) connected by a communication line and including at least one ECU having program reloading capability. The system prevents erroneous abnormality information indicating an ECU whose program has been reloaded is abnormal from remaining stored in other ECUs. An ECU having program reloading capability is connected to other ECUs by a communication line. During normal operation, the ECU controls a control object while performing data communication with the other ECUs in accordance with a control program stored in flash memory. When the ECU receives a reload request, it executes reload processing to overwrite the control program in its flash memory with a new control program. The normality of the communication state of the reprogrammable ECU is monitored by the other ECUs and, when the ECU completes reload processing, it transmits an erasure request ordering that the other ECUs erase from memory the abnormality information generated during the reloading process.

26 Claims, 3 Drawing Sheets

ELECTRONIC CONTROL SYSTEM AND METHOD FOR ERASING ABNORMALITY DATA GENERATED DURING CONTROLLER RELOADING

CROSS-REFERENCE TO RELATED APPLICATION

BACKGROUND OF THE INVENTION

1. Field of the Invention

The present invention relates generally to electronic control systems, and particularly to an automotive electronic control system in which a first electronic control unit (ECU) is connected by a communication line to a second ECU, the first ECU being programmed to erase abnormality data generated at the second ECU when the first ECU is being reloaded.

2. Description of the Related Art

Presently, electronic control units, such as that disclosed in Japanese Unexamined Patent Publication No. Hei. 6-272611 control car engines and the like via a control program stored in nonvolatile memory whose content can be erased and rewritten. Therefore, programs stored therein can be reloaded even after the unit is supplied to the marketplace.

During normal operation, an electronic control unit having a program reloading capability as described above controls a control object, such as an engine, in accordance with a program held in reloadable nonvolatile memory. However, when the controller receives a reload command from an externally connected data reloading device, the controller executes reload processing to overwrite the stored content of the reloadable nonvolatile memory with a new program transmitted from the data reloading device.

In automotive vehicles of recent years, vehicle control systems have been utilized wherein each of a plurality of interconnected ECUs controls a designated control object, such as an engine or a transmission, while performing data communication with the other electronic control units to improve control performance and reduce vehicle wiring. In such a vehicle control system, each ECU uses the following kind of method to monitor the normality of the other ECUs and the communication line interconnecting the ECUs, and stores corresponding abnormality information when determining that there is an abnormality.

For example, each ECU may determine that another ECU with which it is communicating, or the communication line itself, is abnormal when, after transmitting a request message to the other ECU requesting predetermined data, the ECU does not receive a reply message from that ECU within a predetermined time. Upon determining that there is such an abnormality, it stores abnormality information in its own nonvolatile memory (for example, backup RAM or EEPROM backed up with a battery voltage).

However, when the ECU mentioned above is utilized in a vehicle control system, the following problems often occur.

For example, while the program of the ECU is being reloaded, the ECU cannot send a reply message in response to request a message from another ECU during reload processing. Consequently, an ECU which transmits a request message makes the erroneous determination that the reloading ECU is abnormal.

When abnormality information indicating that an ECU whose program has been reloaded is abnormal remains stored in the determining ECU, the determining ECU continues to perform its own control operations with control data set to default values. Consequently, there is a decrease in control performance.

Also, when the abnormality information stored in the ECUs is analyzed, the ECU erroneously determined to be abnormal often is unnecessarily replaced.

The following methods for erasing abnormality information stored in an ECU are set forth, for example, in the Toyota Cavalier Service Manual.

[1]: Connect a fault diagnosis unit to the ECU in which the erasure is required, and perform processing to erase the abnormality information in that ECU by supplying special commands from the fault diagnosis unit.

[2]: Among fuses mounted in the vehicle, remove the fuse corresponding to the ECU in which the erasure is required. By this means, because the power supply from the battery to the ECU in which the erasure is required is cut off, if the abnormality information is stored in backup RAM, that abnormality information can be erased.

[3]: Remove a battery cable of the vehicle from a battery terminal. By this means, because the supply of power from the battery to all of the ECUs is cut off, as in [2] above, if the abnormality information is stored in backup RAM then that abnormality information can be erased.

However, with the methods of [2] and [3] above, when the abnormality information is stored in reloadable nonvolatile memory such as an EEPROM or flash memory, the abnormality information cannot be erased. Even if the abnormality information is stored in backup RAM, because generally not only abnormality information but also learned values and the like used for control are stored in backup RAM, with the methods of [2] and [3] valuable learned values accumulated up to that time are also erased, and the control performance consequently decreases.

With the method of [1] above, on the other hand, work from connecting the fault diagnosis unit to each of the ECUs making up the control system in turn is necessary, and this requires a significant amount of labor.

Furthermore, with the methods of [1] through [3] above, because human labor is required to erase the abnormality data, the possibility that some abnormality information will not be erased is increased.

SUMMARY OF THE INVENTION

It is therefore an object of the present invention to prevent abnormality information indicating that an electronic control unit whose program has been reloaded is abnormal from remaining stored in other electronic control units in a control system, wherein at least one of a plurality of interconnected electronic control units is an electronic control unit having program reloading capability.

An electronic control system according to the present invention that realizes the above object includes a first electronic control unit having a reloadable nonvolatile memory, the first control unit being connected to a second electronic control unit. During normal operation, the first control unit controls a control object via a program stored in its nonvolatile memory while performing data communication with the second control unit. However, when the first control unit receives an external reload command, it executes reload processing to overwrite the program stored in the nonvolatile memory with a new program.

This first control unit is monitored by second control unit. When it is determined by the second control unit to be abnormal, abnormality information indicative thereof is stored in an abnormality information storing memory provided in the second control unit.

Consequently, as described above, when the first control unit executes reload processing, the second control unit may erroneously determine that the first control unit is operating abnormally, and erroneous abnormality information may be stored in the abnormality information storing memory of the second control unit.

In the electronic control system of the present invention, when reload processing finishes at the first control unit, an erasure request transmitter transmits an erasure request to the second control unit and thereby causes abnormality information stored in the abnormality information storing memory to be erased.

Therefore, it is possible to prevent erroneous abnormality information from remaining stored in the abnormality information storing memory of the second control unit. Also, erroneous abnormality information can be erased even when memory other than backup RAM, such as EEPROM or flash memory, is used as the abnormality information storing memory. It is also possible for abnormality information to be erased without learned values and the like being erased at the same time. Thus, it is possible to resolve all of the limitations of the above-discussed present automotive control systems.

According to a second embodiment of the present invention, an erasure request transmitter may be provided in the above-described system to transmit an erasure request to the second control unit to erase only abnormality information relating to the first control unit.

An electronic control unit according to this second embodiment thus has the merit that, even when there are a plurality of other devices, it is possible for only erroneous abnormality information (i.e. erroneous abnormality information to the effect that an electronic control unit whose program has been reloaded is abnormal) stored in the abnormality information storing memories of those devices being reloaded to be erased.

DETAILED DESCRIPTION OF THE PREFERRED EMBODIMENTS

The present invention will now be described with reference to the accompanying drawings.

Figure 1:
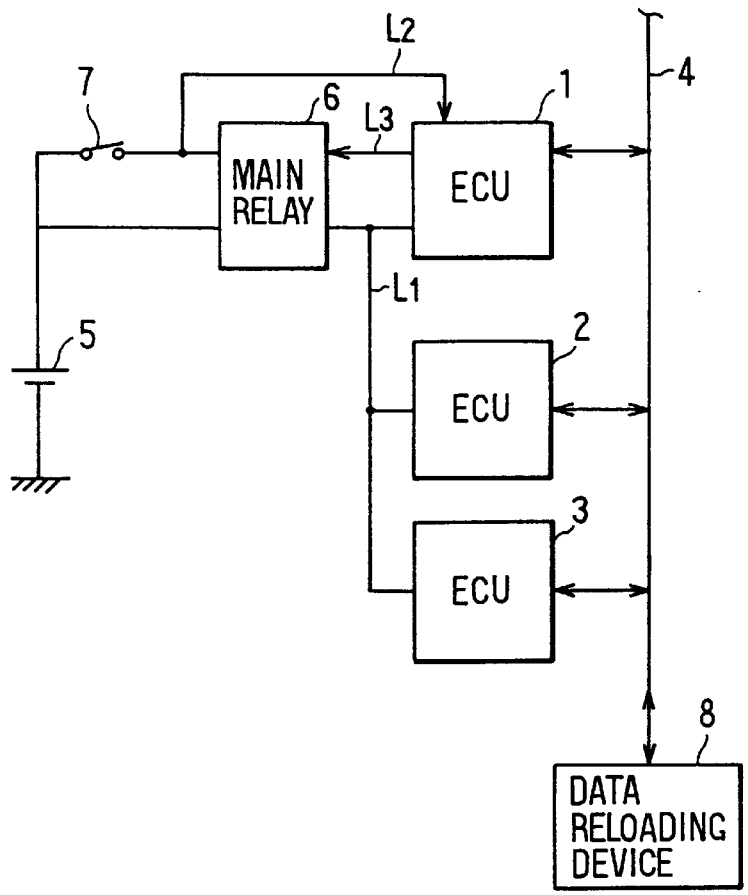
FIG. 1 is a block diagram showing the overall construction of a vehicle control system constituting a preferred embodiment of the invention.

FIG. 1 is a block diagram showing the overall construction of a vehicle control system in which the invention has been applied.

As shown in FIG. 1, the vehicle control system has three ECUs (electronic control units) 1, 2, 3 for controlling different parts of a vehicle. For example, the ECU 1 is an ECU controlling an engine as its control object, the ECU 2 is an ECU controlling a transmission as its control object, and the ECU 3 is an ECU controlling hydraulic circuits of a braking system.

The ECUs 1, 2, 3 are connected by a communication line 4 disposed inside the vehicle so that data can be transmitted among the ECUs.

Also, the ECUs 1, 2, 3 are constructed so that internal control programs thereof can be reloaded while the ECUs 1, 2, 3 are installed on board the vehicle. When the control program of any of the ECUs 1, 2, 3 is to be reloaded, a data reloading device 8 is connected to the communication line 4.

The three ECUs 1, 2, 3 are connected to a common power supply line L1. All three ECUs 1, 2, 3 are powered by the voltage (battery voltage) of a battery 5 supplied to the power supply line LI through a main relay 6.

When an ignition switch 7 of the vehicle is switched on or a drive signal is fed to the main relay 6, contacts of the main relay 6 close and connect the plus terminal of the battery 5 to the power supply line L1. As a result, the ECU 1 feeds a drive signal to the main relay 6 by way of a signal line L3.

That is, when the ignition switch 7 is switched on, the contacts of the main relay 6 close and a battery voltage is supplied to each of the ECUs 1, 2, 3 by way of the power supply line L1, whereupon the ECUs 1, 2, 3 start to operate. The ECU 1 then detects that the ignition switch 7 is on based on the voltage level of a signal line L2 for switch state detection. Thereafter, the ECU outputs a drive signal to the signal line L3 and thereby keeps the contacts of the main relay 6 closed until it determines that conditions for stopping the operation of the vehicle control system are established.

Therefore, even if the ignition switch 7 is switched off, the contacts of the main relay 6 remain closed until conditions for operation stoppage of the vehicle control system are established. When the ignition switch 7 has been switched off and furthermore the operation stoppage conditions are established, the power supply to all of the ECUs 1, 2, 3 is cut off.

Next, the internal constructions of the ECUs 1, 2, 3 will be described taking the ECU 1 as an example.

Figure 2:
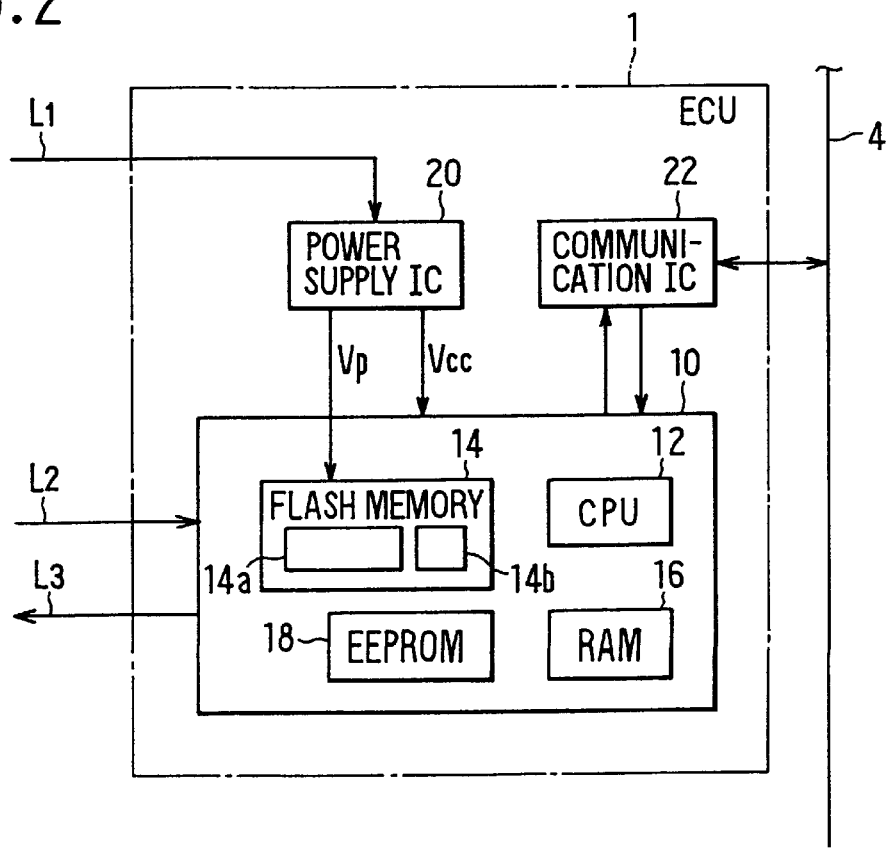
FIG. 2 is a block diagram showing the internal construction of an ECU shown in FIG. 1.

As shown in FIG. 2, the ECU 1 has a single chip microcomputer 10, a communication IC 22 including transmitting and receiving circuits for performing communication with the other ECUs 2, 3 or a data reloading device 8, and a power supply IC 20 for supplying an operating voltage VCC (for example 5V) to parts of the ECU 1 such as the microcomputer 10 and the communication IC 22.

Built into the microcomputer 10 are a CPU 12 for executing programs, a flash memory 14 serving as nonvolatile ROM in which the programs executed by the CPU 12 are stored, a RAM 16 for temporarily storing computation results produced by the CPU 12, and a nonvolatile EEPROM 18 for continuously storing abnormality information and learned values and the like, which will be further discussed later.

Here, the flash memory 14 is divided into a reloadable area 14a serving as nonvolatile memory whose stored content can be reloaded, and a non-reloadable area 14b whose stored content cannot be reloaded (or the reloading of the stored content of which is prohibited). A control program executed at normal times is held in the reloadable area 14a, and a boot program, executed immediately after resetting is discontinued, is held in the non-reloadable area 14b.

The reloadable area 14a of the flash memory 14 is a memory area where data can be erased and written while a predetermined reloading voltage VP (for example 12V) is impressed upon it. In the present embodiment, the power supply IC 20 impresses the reloading voltage VP on the reloadable area 14a in response to a command from the microcomputer 10. The power supply IC 20 also has a so-called power-on resetting function for outputting a reset signal to the microcomputer 10 for a predetermined time, when the operating voltage VCC starts to be supplied as the ignition switch 7 is switched on, and within which that operating voltage VCC can be expected to stabilize.

The other ECUs 2, 3 have the same construction as the ECU 1 except that the microcomputers 10 of the ECUs 2, 3 are not connected to the signal lines L2, L3 for controlling the main relay 6. Thus, in the present embodiment, of the three ECUs 1, 2, 3, only the microcomputer 10 of the ECU 1 is connected to the signal lines L2, L3 as shown in FIG. 2.

In each of the ECUs 1, 2, 3 constructed as described above, when the ignition switch 7 is switched on and the reset signal from the power supply IC 20 to the microcomputer 10 is discontinued, the CPU 12 of the microcomputer 10 first executes the boot program stored in the non-reloadable area 14b of the flash memory 14. Subsequently, when there is no reload request message constituting a reload command from a data reloading device 8 to the respective ECU, the CPU 12 according to the boot program calls the control program stored in the reloadable area 14a of the flash memory 14.

Thereafter, the ECUs 1, 2, 3 perform the following normal operation by the CPU 12 of the microcomputer 10 executing the control program in the reloadable area 14a in each of the ECUs.

That is, each of the ECUs 1, 2, 3 controls the control object allocated to it while performing data communication (data exchange) with the other ECUs by way of the communication line 4. Each of the ECUs 1, 2, 3 also monitors the normality of the communication state of any of the other ECUs with which it is communicating and, when it determines that another ECU is abnormal, stores abnormality information indicating that the respective ECU is abnormal in the EEPROM 18. For example, each of the ECUs 1, 2, 3 determines that an ECU with which it is communicating is abnormal when, after transmitting a request message to that ECU requesting predetermined control data, it does not receive a reply message within a predetermined set time.

Of the three ECUs 1, 2, 3, the ECU 1 has a program for controlling the main relay 6 added to the control program held in its flash memory 14. As mentioned above, the ECU 1 detects on the basis of the voltage level of the signal line L2 that the ignition switch 7 has been switched on, and outputs a drive signal to the main relay 6 through the signal line L3 until it determines that conditions for stopping the operation of the vehicle control system are established.

When on the other hand the CPU 12 of the microcomputer 10 in any of the ECUs 1, 2, 3 detects on executing its boot program that a reload request message to its ECU has been transmitted from a data reloading device 8, it performs reloading processing for overwriting the control program held in the reloadable area 14a with a new control program transmitted to it from the data reloading device 8.

Details of the main processing executed by the microcomputer 10 of each of the ECUs 1, 2, 3 will now be described using FIG. 3 through FIG. 5.

Figure 3:
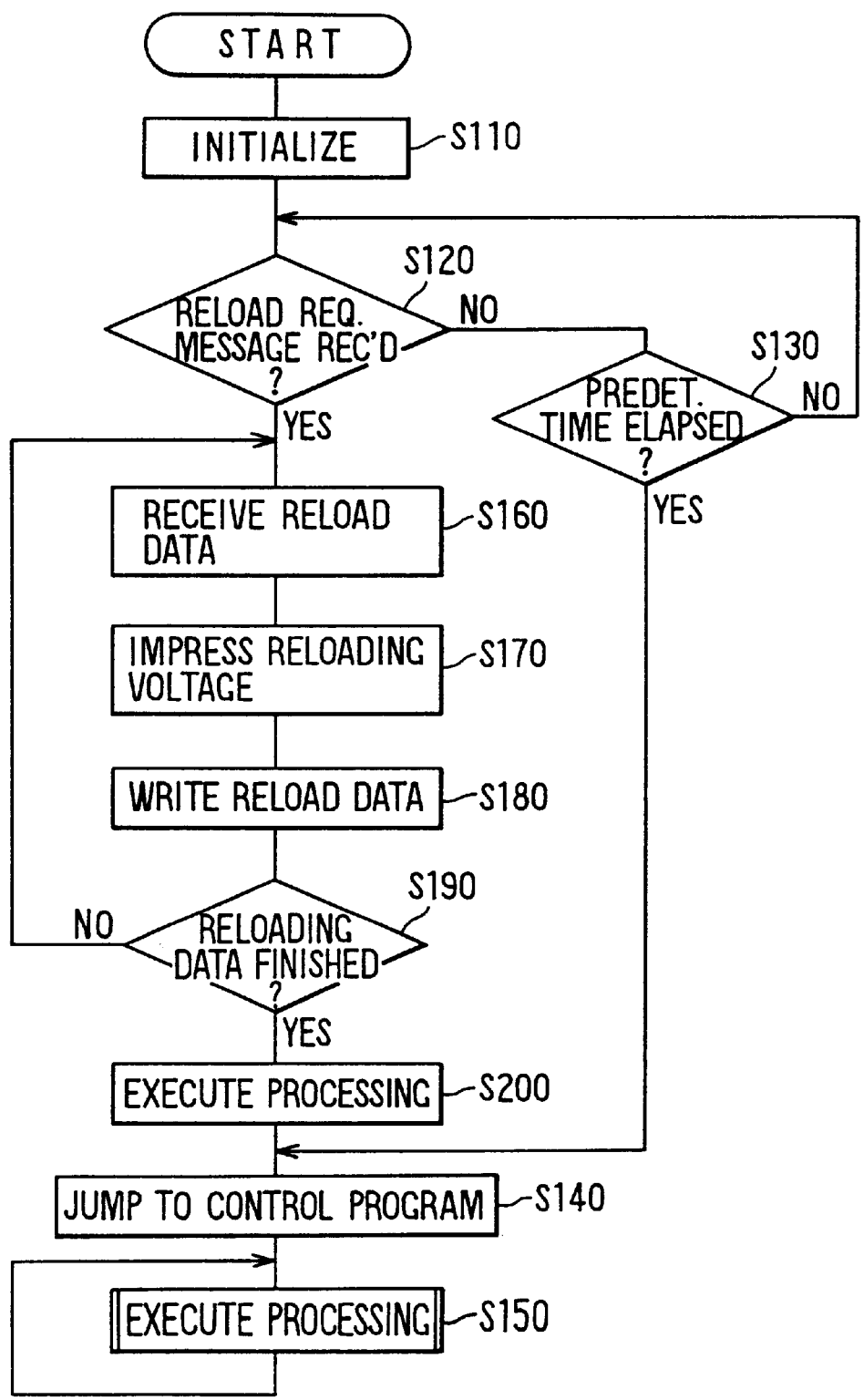
FIG. 3 is a flow diagram showing processing executed immediately after the start of operation of the ECUs shown in FIG. 1.

First, FIG. 3 is a flow diagram of processing of the boot program stored in the non-reloadable area 14b of the flash memory 14 of each ECU.

As shown in FIG. 3, the boot program held in the non-reloadable area 14b starts when the ignition switch 7 is switched on and the microcomputer 10 starts operating from a reset state.

At step (hereinafter, 'S') 110, the RAM 16 and internal registers etc. are initialized. Then, at S120 it is determined whether or not a reload request message to the present ECU has been received from a data reloading device 8. Included in any reload request message transmitted from a data reloading device 8 is an identification code identifying the ECU whose control program is to be reloaded. At S120, if a reload request message has been received from a data reloading device 8 and furthermore the identification code included in that reload request message is the code indicating the present ECU, it is determined that a reload request message to the present ECU has been received.

Here, when at S120 it is determined that a reload request message to the present ECU has not been received, processing proceeds to S130, and it is determined whether or not a predetermined time has elapsed. If the predetermined time has not elapsed, processing returns to S120.

When at S130 it is determined that the predetermined time has elapsed, processing proceeds to S140 and jumps to the control program held in the reloadable area 14a of the flash memory 14. When this happens, thereafter, as shown at S150, control processing based on the control program in the reloadable area 14a is executed, and the normal operation described above is carried out.

When on the other hand at S120 it is determined that a reload request message to the present ECU has been received from a data reloading device 8, processing proceeds to S160, and reloading processing of S160 through S190 is carried out.

That is, first, at S160, a predetermined number of bytes of reload data constituting a new control program to be stored in the reloadable area 14a transmitted from the data reloading device 8 are received.

Then, at S170, the reloading voltage VP is impressed from the power supply IC 20 onto the reloadable area 14a of the flash memory 14. As a result, the data of the area in the reloadable area 14a where the reload data received in S160 is to be written is erased. Subsequently, at S180, the reload data received at S160 is written to the area of the reloadable area 14a on which data erasure was carried out at S170.

Next, processing proceeds to S190, where it is determined whether or not reloading of all the data in the reloadable area 14a has been completed. When reloading of all that data has not been finished, processing returns to S160.

When at S190 it is determined that reloading of all the data in the reloadable area 14a has been finished (that is, that reloading processing has ended), the CPU proceeds to S200 and transmits to the other ECUs an erasure request ordering any abnormality information relating to the present ECU to be erased. Included in this erasure request is an identification code identifying the ECU transmitting the request. Therefore, the other ECUs can identify the ECU that transmitted the erasure request by detecting this identification code.

After the erasure request is transmitted at S200, processing proceeds to S140 and jumps to the control program held in the reloadable area 14a of the flash memory 14. When this happens, as shown at S150, control processing based on the control program in the reloadable area 14a is executed. However, in this case, control processing based on the new control program written in the reload processing of S160 through S190 is executed, and the normal operation described above is thereby carried out.

Figure 4:
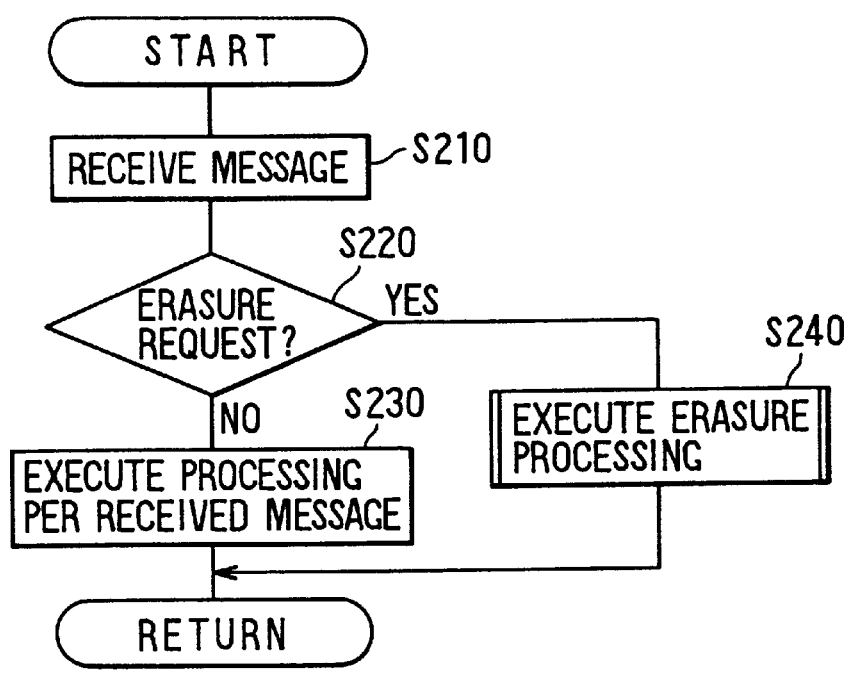
FIG. 4 is a flow diagram showing reception processing executed by the ECUs of FIG. 1.

FIG. 4 is a flow diagram showing reception processing, among control processing based on the control program in the reloadable area 14a, for making the ECUs 1, 2, 3 carry out operations corresponding to different messages transmitted thereto through the communication line 4. This reception processing is executed either when a message has arrived through the communication line 4 or at predetermined time intervals.

As shown in FIG. 4, when the microcomputer 10 of any of the ECUs 1, 2, 3 starts to execute reception processing, first, at S210, the microcomputer receives a message.

Then, at S220, it is determined whether or not the message received at S210 is an erasure request from another ECU of the kind mentioned above. If it is not an erasure request, processing proceeds to S230 and executes processing corresponding to the received message, and the present reception processing ends. Processing corresponding to the received message performs an exchange of data, such as replying with control data indicating the most recent engine speed obtained by the present ECU, if the received message requests control data indicating the present engine speed.

Figure 5:
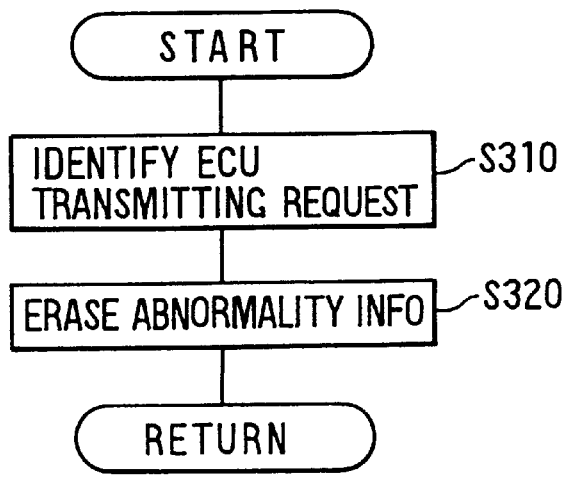
FIG. 5 is a flow diagram showing erasure processing executed in the reception processing of FIG. 4.

When on the other hand at S220 it is determined that the message received at S210 is an erasure request, processing proceeds to S240 and executes the erasure processing represented by the flow diagram in FIG. 5.

At S310, the CPU identifies the ECU that transmitted the erasure request by detecting the identification code included in the erasure request received at S210. Then, any abnormality information relating to the ECU thus identified is determined to be abnormality information to be erased.

Next, at S320, the CPU erases the abnormality information determined at S310 to be abnormality information to be erased, from the abnormality information stored in the EEPROM 18.

After the processing at S320, the present erasure processing ends, whereupon the reception processing of FIG. 4 also ends.

As described above in detail, in the vehicle control system of the present preferred embodiment, at normal times (S120: NO, S130: YES), by operating according to the control program stored in the reloadable area 14a of its flash memory 14, each of the three ECUs 1, 2, 3 controls its control object while performing data communication with the other ECUs, and also monitors the normality of the communication states of those other ECUs. When each of the ECUs detects an abnormality, it stores information indicating that abnormality in its own EEPROM 18 (S150).

When any of the three ECUs 1, 2, 3 receives a reload request message from a data reloading device 8 (S120: YES), it executes reload processing to reload the control program stored in its reloadable area 14a with a new control program received from the data reloading device 8 (S160 through S190).

Consequently, in the vehicle control system of the preferred embodiment, it is possible to reload the control program of that ECU by connecting a data reloading device 8 to the communication line 4 and thereafter transmitting a reload request message from that data reloading device 8 to any of the ECUs 1, 2, 3.

However, when any of the three ECUs 1, 2, 3 is executing reload processing, that ECU cannot reply to a message from another ECU carrying out normal operation. Therefore, there is a possibility of a reloading ECU being misdetermined by the other ECUs to be abnormal. As a result, erroneous abnormality information indicating that the reloading ECU is abnormal may be stored in the EEPROMs 18 of the other ECUs.

To avoid the above situation, in the vehicle control system of this preferred embodiment, when any of the ECUs 1, 2, 3 finishes an execution of reload processing (S190: YES), it transmits to the other ECUs an erasure request ordering the erasure of any abnormality information relating to it (S200). Each of the ECUs 1, 2, 3 then erases respective abnormality information stored in its own EEPROM 18 in response to an erasure request from another ECU (S310, S320).

Therefore, in a vehicle control system according to the present preferred embodiment made up of ECUs 1, 2, 3, erroneous abnormality information in the other ECUs can be deleted without the need for human intervention. Also, erroneous abnormality information can be erased without fail notwithstanding that an EEPROM 18, whose stored content remains even when its power supply is cut off, is being used as the memory for holding the abnormality information. Further, there is no erasing of valuable learned values and the like stored in the EEPROM 18.

Although the invention has been described here with reference to a specific presently preferred embodiment thereof, the invention is of course not limited to the preferred embodiment described above and can be realized in various other forms.

For example, in the preferred embodiment described above, because when any of the ECUs 1, 2, 3 finishes reload processing, it transmits to the other ECUs an erasure request ordering the erasure of only abnormality information relating to itself, it is possible to erase erroneous abnormality information only. However, alternatively, the ECUs 1, 2, 3 may be made to transmit to the other ECUs an erasure request ordering the erasure of abnormality information relating to all of the ECUs. Specifically, this can be realized by an erasure request not including any ECU identification code being transmitted at S200 of FIG. 3 and abnormality information relating to all of the ECUs being determined to be abnormality information to be erased at S310 of FIG. 5.

Further, although in the preferred embodiment described above all of the ECUs 1, 2, 3 connected to the communication line 4 are constructed so that their control programs are on-board reloadable, when only the one ECU 1 is to be made on-board reloadable, the processing of FIG. 3 can be carried out by the ECU 1, and only S110, S140 and S150 of the processing of FIG. 3 together with the processing of FIG. 4 and FIG. 5 need be carried out in the other ECUs 2 and 3. In this case, it is not necessary for the ECU 1 to carry out the erasure processing of FIG. 5.

In addition, although in the preferred embodiment described above the data reloading device 8 is connected to the communication line 4, alternatively each of the ECUs 1, 2, 3 may be provided with a dedicated connector for the data reloading device 8 so that the data reloading device 8 may be individually connected to the ECUs 1, 2 and 3.

And although in the preferred embodiment described above the ECUs 1, 2, 3 are each constructed to store abnormality information and learned values and the like in an EEPROM 18, alternatively the ECUS may be provided with backup RAM for storing abnormality information and learned values.

In addition, whereas in the preferred embodiment described above a flash memory 14 was used as rewritable nonvolatile memory in the ECUs 1, 2, 3, other electronically rewritable ROM such as EEPROM may alternatively be used.

Finally, although in the preferred embodiment described above the invention is applied to a vehicle control system for controlling an automotive vehicle, the invention can also be applied in exactly the same way to a control system for controlling any other object of control with a plurality of ECUs, such as a machine tool or the like.

While the above description is of the preferred embodiments of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. An electronic control system, comprising:
   a first electronic control unit that controls a control object during normal operation and that has a reloadable nonvolatile memory;
   a second electronic control unit in communication with the first electronic control unit;
   the first electronic control unit operating in accordance with a program stored in the nonvolatile memory and executing reload processing for overwriting the program with a new program upon receiving a reload command;
   the second electronic control unit monitoring the first electronic control unit and storing information indicating that the first electronic control unit is abnormal in an associated abnormality information storing memory when a communication state of the first electronic control unit is determined by the second electronic control unit to be abnormal; and
   wherein the first electronic control unit transmits an erasure request to the second electronic control unit to erase the information stored in the abnormality information storing memory when the reload processing has finished.

2. The electronic control system of claim 1, wherein the first electronic control unit transmits a request ordering erasure of only abnormality information relating to the first electronic control unit.

3. The electronic control system of claim 1, wherein the second electronic control unit controls a second control object.

4. The electronic control system of claim 3, wherein the second electronic control unit stores information indicating that the first electronic control unit is abnormal when it is determined that the communication state of the first electronic control unit is abnormal; and
   the second electronic control unit includes erasing means for erasing the information in the abnormality information storing memory in response to an erasure request transmitted from the first electronic control unit.

5. The electronic control system of claim 1, further comprising a communication link that connects the first electronic control unit and the second electronic control unit, at least one of the first electronic control unit and the second electronic control unit monitoring the communication link for abnormal operation.

6. The electronic control system of claim 1, wherein the system is a motor vehicle electronic control system.

7. The electronic control system of claim 1, wherein said information indicating that the first electronic control unit is abnormal results during a time when said first electronic control unit executes said reload processing.

8. An electronic control system, comprising:
   first and second control units, the first control unit having a reloadable nonvolatile memory and an abnormality information storing memory, and that controls a control object while performing data communication with the second control unit during normal operation by operating in accordance with a program held in the nonvolatile memory, the first control unit monitoring the second control unit and storing in the abnormality information storing memory abnormality information upon determining a communication state of the second control unit to be abnormal;
   the first control unit executing reload processing for overwriting the program held in the nonvolatile memory with a new program upon receiving a reload command;
   the second control unit monitoring a communication state of the first control unit, and storing in an abnormality information storing memory abnormality information indicating that the first control unit is abnormal when the communication state of the first control unit is determined by the second control unit to be abnormal; and
   the first control unit transmitting to the second control unit an erasure request ordering erasure of the abnormality information stored in the abnormality information storing memory of said second control unit when the reload processing of said first control unit has finished, and
   erasing means for erasing abnormality information in the abnormality information storing memory of the first control unit in response to an erasure request transmitted from the second control unit.

9. The electronic control system of claim 8, wherein the erasing means is included in the first control unit.

10. The electronic control system of claim 8, wherein the first control unit transmits to the second control unit a request ordering the erasure of only abnormality information relating to the first control unit as the erasure request.

11. The electronic control system of claim 8, further comprising a plurality of control units being interconnected by a communication link and a monitoring device monitoring the communication link for abnormal operation.

12. The electronic control system of claim 11, wherein each of the plurality of control units includes erasure request means for generating a non-specific order for erasure of abnormality information stored in others of the plurality of control units when an execution of the reload processing thereat has finished.

13. The electronic control system of claim 11, wherein at least one of the plurality of control units monitors the communication link for abnormal operation.

14. The electronic control system of claim 11, wherein the system is a motor vehicle electronic control system.

15. The control system of claim 8, wherein said information indicating that the first control unit is abnormal results during a time when said first control unit executes said reload processing.

16. A controller for controlling an object in accordance with an object control program stored therein, the controller also for communicating with and monitoring other controllers, and storing information relating to abnormal operation of the other controllers, the controller being capable of executing reload processing for overwriting the object control program with a new externally-provided program upon receiving a reload command, the controller also being programmed to transmit to the other controllers an erasure request ordering erasure of abnormality information stored in the other controllers after the controller executes the reload processing.

17. The controller of claim 16, wherein said abnormality information results during a time when the controller executes said reload processing.

18. A control method comprising the steps of:
providing a first control device to control a control object in accordance with a stored control program while performing data communication with another control device during normal operation;
receiving a remotely generated control program reload command in said first control device;
erasing the stored control program in said first control device;
storing a remotely-downloaded new control program in said first control device; and
causing abnormality data generated by and stored in the other control device during the steps of erasing and storing to automatically be erased after the step of storing is completed.

19. The method of claim 18, wherein the step of providing said first control device to control a control object in accordance with said stored control program while performing data communication comprises performing data communication with a plurality of other control devices.

20. The method of claim 19 wherein the step of causing comprises causing abnormality data generated by and stored in the plurality of other control devices during the steps of erasing and storing to automatically be erased after the step of storing is completed.

21. The method of claim 18 wherein the step of causing abnormality data generated by and stored in the other control device includes transmitting an erasure request from the first control device to the other control device after the step of storing is completed.

22. The method of claim 21, wherein the erasure request from said first control device to the other control device comprises a request to erase only abnormality data relating to said first control device.

23. The method of claim 21, wherein the other control device erases said abnormality data stored therein after receiving said erasure request from said first control device.

24. The method of claim 18, wherein the other control device controls a second control object.

25. The method of claim 18, further comprising establishing a communications link between said first control device and the other control device and monitoring the communications link for abnormal operation.

26. The method of claim 18, further comprising installing said first control device and said other control device in a motor vehicle control system.

* * * * *